United States Patent
Webb et al.

(10) Patent No.: US 10,735,262 B1
(45) Date of Patent: Aug. 4, 2020

(54) SYSTEM AND METHOD FOR SELF-ORCHESTRATED CANARY RELEASE DEPLOYMENT WITHIN AN API GATEWAY ARCHITECTURE

(71) Applicant: Intuit Inc., Mountain View, CA (US)

(72) Inventors: Jason Webb, Valley Center, CA (US); Chengappa Iychodianda, San Diego, CA (US); Karen Fraser, Encinitas, CA (US); Puja Baid, Marina del Rey, CA (US); Siddalinga Shivasharanappa Hirapur, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 218 days.

(21) Appl. No.: 15/963,814

(22) Filed: Apr. 26, 2018

(51) Int. Cl.
*H04L 12/24* (2006.01)
*H04L 29/08* (2006.01)
*H04L 12/26* (2006.01)

(52) U.S. Cl.
CPC ........ *H04L 41/0866* (2013.01); *H04L 41/082* (2013.01); *H04L 43/50* (2013.01); *H04L 67/2809* (2013.01)

(58) Field of Classification Search
CPC ... H04L 41/0866; H04L 41/082; H04L 43/50; H04L 67/2809; H04L 67/10; H04L 41/22; H04L 61/1511; H04L 61/2015; H04L 61/2076; H04L 61/302; H04L 61/3025; H04L 61/303; H04L 61/3065; H04L 47/2483; H04L 47/6295; H04L 47/781; H04L 49/30; G06N 20/00; G06F 9/45558; G06F 12/0897; G06F 16/122
See application file for complete search history.

(56) References Cited

U.S. PATENT DOCUMENTS

| | | | |
|---|---|---|---|
| 6,622,175 B1 * | 9/2003 | Piller | G06F 9/465 719/313 |
| 9,626,177 B1 | 4/2017 | Madduri et al. | |
| 2002/0111922 A1 * | 8/2002 | Young | G06Q 50/188 705/80 |
| 2011/0161444 A1 * | 6/2011 | Chauhan | H04L 51/32 709/206 |
| 2013/0318160 A1 * | 11/2013 | Beraka | H04L 67/104 709/204 |

(Continued)

OTHER PUBLICATIONS

Zhang; "A Unified API Gateway for High Availability Clusters" (Zhang); 2013 International Conference on Mechatronic Sciences, Electric Engineering and Computer (MEC) (p. 2321-2325); Dec. 20-22, 2013; IEEE. (Year: 2013).*

*Primary Examiner* — Ninos Donabed
(74) *Attorney, Agent, or Firm* — Paradice and Li LLP

(57) ABSTRACT

API gateways are updated utilizing canary release deployment in which a message broker delivers update messages to the API gateways first using a point-to-point messaging model and then a publish-and-subscribe messaging model. All the API gateways are capable of receiving point-to-point messages and publish-and-subscribe messages. First, a canary API gateway receives an update message from a message queue of the message broker and deploys the associated update on the canary API gateway. If deployment of the update is successful, then non-canary API gateways receive the update message from a message topic of the message broker and deploy the associated update on the non-canary API gateways.

16 Claims, 5 Drawing Sheets

(56) References Cited

U.S. PATENT DOCUMENTS

| | | | |
|---|---|---|---|
| 2014/0075499 A1* | 3/2014 | Arun | G06F 16/2282 726/1 |
| 2014/0082586 A1* | 3/2014 | Casey | G06F 8/24 717/104 |
| 2014/0245262 A1* | 8/2014 | Hill | G06F 8/70 717/120 |
| 2015/0074689 A1* | 3/2015 | Christiansen | G06F 21/57 719/320 |
| 2016/0212159 A1* | 7/2016 | Gupta | H04L 63/145 |
| 2016/0224790 A1* | 8/2016 | Gupta | G06F 21/52 |
| 2017/0118110 A1* | 4/2017 | Cohen | H04L 67/42 |
| 2017/0123957 A1* | 5/2017 | Gupta | G06F 11/0715 |
| 2018/0060568 A1* | 3/2018 | Galenson | G06F 21/54 |
| 2018/0077420 A1* | 3/2018 | Dunham | G06F 16/71 |
| 2018/0091624 A1* | 3/2018 | Forbes | H04L 45/74 |
| 2018/0121312 A1* | 5/2018 | Sadowski | G06F 11/3452 |
| 2018/0143781 A1* | 5/2018 | Greathouse | G06T 1/60 |
| 2019/0129980 A1* | 5/2019 | Cho | G06F 16/951 |
| 2019/0138725 A1* | 5/2019 | Gupta | H04L 63/1433 |
| 2019/0273746 A1* | 9/2019 | Coffing | H04L 63/105 |

* cited by examiner

SYSTEM AND METHOD FOR SELF-ORCHESTRATED CANARY RELEASE DEPLOYMENT WITHIN AN API GATEWAY ARCHITECTURE

BACKGROUND

An application program interface (API) gateway provides an intermediary between an API service and an API consumer that consumes the API service. One of the intermediary roles of an API gateway is to expose the API service to the API consumer and to control the traffic between the API consumer and the API service. Typically, the API service consists of a plurality of APIs, and each API has an endpoint that provides an entry to the API for the API consumer. An API gateway exposes each API endpoint by acting as a proxy for the respective API. An API gateway, or a grouping of API gateways, acts as a facade of endpoints for the API consumer to consume the service offered by each API. A typical consumption by an API consumer is a request to an API followed by a response by the API. The API gateway's facade of the API service enables the API gateway to receive requests from an API consumer for an exposed API, route requests to an appropriate API, route API responses to an appropriate API consumer, enforce security of each request, and perform traffic manipulation such as performing rate limiting on calls to an API.

In a typical API gateway architecture, a plurality of API consumers, such as devices, applications, and websites, are communicatively coupled to a set of API gateways in order to consume API services. The set of API gateways provide a facade for groupings of a plurality of API services, and each of the API services comprise at least one API. Each API gateway provides multitenant capabilities for groupings of API services. Such multitenant capabilities include load balancing strategies to route requests to one of a plurality of identical or similar API services.

The functionality of an API gateway is typically controlled by configuration data. In a traditional API gateway architecture, the configuration data of an API gateway is updated utilizing a release orchestration tool. A traditional release orchestration tool treats each API gateway as a node, and groups of nodes are updated in phases. The first group of nodes is traditionally updated as a canary release, i.e., a limited test release to ensure the update meets a quality standard and is functional within the first group of nodes. The first group of nodes that is traditionally updated by a traditional release orchestration tool allows for the detection of an update failure that, if present, is isolated to the first group of nodes acting as the canary. This canary release process avoids the massive failure that would have occurred if the update had been deployed to all the nodes at once.

However, with a traditional release orchestration tool, a development team that wishes to implement an update to the set of API gateways must wait for the release orchestration tool to implement a first phase canary release of the update. A typical release orchestration tool is a centralized tool operating apart from the set of API gateways, traditionally requiring a manual process to execute the release orchestration tool to make updates to API gateways. Traditionally, even if fifty or more updates were required in a day, such updates would be batch deployed once a day, typically at night, and that daily deployment would be considered fragile due to the release orchestration tool operating as a centralized tool apart from the API gateways. Further, the failures of the deployment of updates is indicative of the manual processing required to monitor a traditional release orchestration tool's deployment, indicating the fragility of a traditional release orchestration tool's operation.

Consequently, there is currently a significant need in the API services arts to provide for a self-orchestrated canary release deployment system and method within an API gateway architecture capable of decentralized deployment of API gateway updates in real-time manner, thereby providing a more efficient and robust API service provider system.

SUMMARY

Embodiments of the present disclosure provide a technical solution to the technical problem of providing an efficient system and method for self-orchestrated canary release deployment within an API gateway architecture.

The disclosed technical solution includes providing a message broker within an API gateway architecture. The message broker first utilizes a point-to-point messaging model to cause the update of a canary API gateway that tests the update. Then, the message broker utilizes a publish-and-subscribe messaging model to cause the update of remaining non-canary API gateways based on the update that was previously deployed by the canary API gateway.

In one embodiment, the message broker receives an update message for an update to a set of API gateways. In one embodiment, the message broker places the update message in a message queue of a message queue module for point-to-point messaging. In one embodiment, each API gateway is configured to be able to initiate a pull of the update message, and the message queue module ensures that only one API gateway receives the update message to become a canary API gateway.

In one embodiment, one of the API gateways is the first to request a pull of the update message from the message queue module, and this API gateway is designated a canary API gateway. In one embodiment, the message queue module of the message broker simultaneously transmits the update message to the canary API gateway and removes the update message from the message queue, so that no other API gateway modules can request a pull of the update message. In one embodiment, the canary API gateway deploys the update referenced in the update message with a deployment module, which tests for a successful deployment. If the deployment of the update to the canary API gateway is determined to be successful, then the canary API gateway transmits the update message to a message topic module of the message broker.

In one embodiment, the message topic module of the message broker provides the update message as a message topic for publish-and-subscribe messaging. In one embodiment, the message topic is available to all of the API gateways excluding the canary API gateway. In one embodiment, the non-canary API gateways are configured to be able to initiate a subscription of the message topic. In one embodiment, the message topic module transmits the message topic to all of the non-canary API gateways that subscribed to the message topic. In one embodiment, each non-canary API gateway that receives the message topic deploys the update referenced in the update message with a respective deployment module.

Figure 1A:
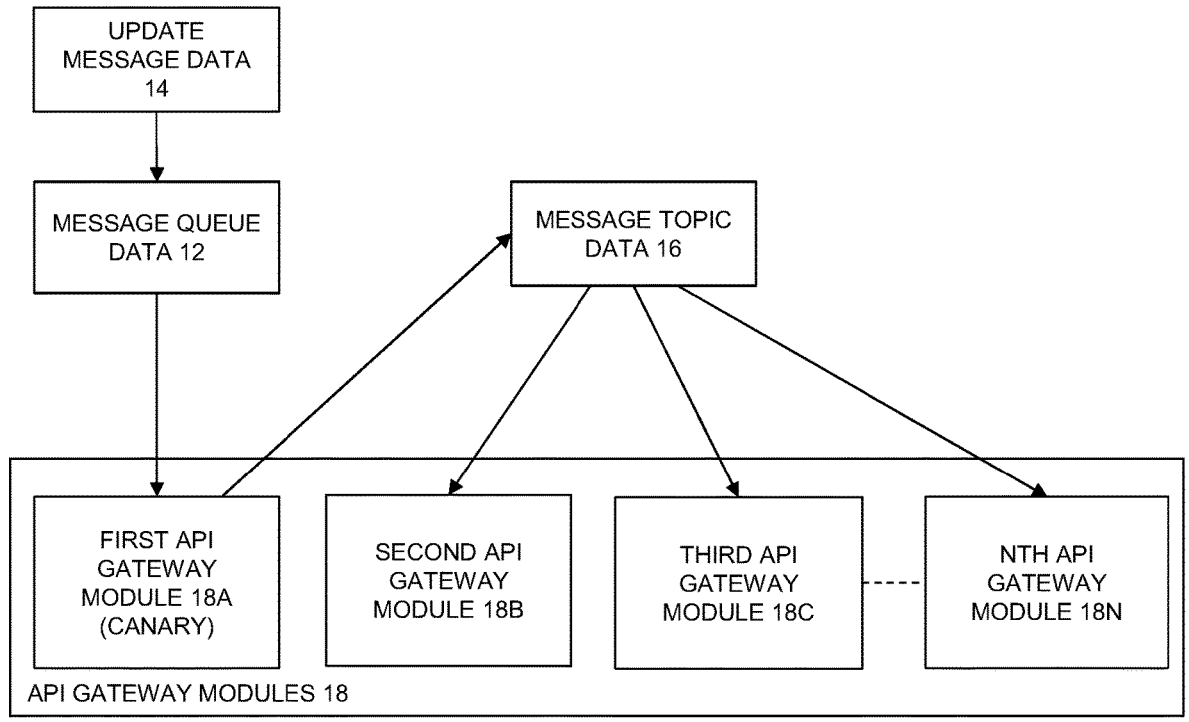
FIG. 1A is functional block diagram of a self-orchestrated canary release deployment system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Overview

As discussed in more detail below, embodiments of the present disclosure represent a technical solution to the technical problem of effectively and efficiently deploying updates to a plurality of API gateway modules. In one embodiment, the technical solution includes a disclosed message broker module that utilizes a point-to-point messaging model to deliver update message data to an API gateway module acting as a canary API gateway module and utilizes a publish-and-subscribe messaging model to deliver the update message data to API gateway modules acting as non-canary gateway modules.

FIG. 1A is functional block diagram of a self-orchestrated canary release deployment system 10, in accordance with one embodiment. In one embodiment, the message broker module provides an asynchronous messaging service between autonomous environments, systems, applications, modules, and other messaging clients as discussed herein, or as known in the art at the time of filing, or as developed, or becomes available, after the time of filing. In one embodiment, the message broker module provides messaging services between an engineer system and a plurality of API gateway modules 18. In one embodiment, the message broker module includes a message queue module and a message topic module. In one embodiment, the message broker module utilizes the Java Message Service (JMS) messaging standard.

In one embodiment, the message queue module of the message broker module implements a point-to-point messaging model in which update message data 14 is delivered from an engineer system to a single API gateway module 18A via the message queue module. In one embodiment, an engineer utilizes an engineer system to deliver update message data 14 to a destination of message queue data 12 of the message queue module. In one embodiment, the update message data 14 is held in the message queue data 12 until an API gateway module 18A initiates a pull of the message queue data 12 comprising the update message data 14. In one embodiment, the message queue module ensures that only one API gateway module 18A can initiate a pull of the message queue data 12 comprising the update message data 14. In one embodiment, the message queue module holds the message queue data 12 comprising the update message data 14 until a single API gateway module 18A initiates a pull of the message queue data. In one embodiment, in response to a single API gateway module 18A initiating a pull of the message queue data 12 comprising the update message data 14, the message queue module delivers the update message data 14 to the pulling API gateway module 18A as pulled queue data and removes the update message data 14 from the message queue data 12. In one embodiment, removal of the update message data 14 from the message queue data 12 ensures that no other API gateway modules 18B and 18C through 18N can initiate a pull of the message queue data 12 after the initial pull by the single API gateway module 18A, which acts as a canary API gateway module.

In one embodiment, the message topic module of the message broker module implements a publish-and-subscribe messaging model in which update message data 14 is delivered from a first API gateway module 18A acting as a canary API gateway module, which had pulled the update message data 14 from the message queue module, to a plurality of API gateway modules 18B and 18C through 18N via the message topic module. In one embodiment, a single API gateway module 18A acting as a canary API gateway module delivers the update message data 14 to a destination of message topic data 16 of the message topic module. In one embodiment, the update message data 14 is then available to be delivered to any API gateway module 18B and 18C through 18N, i.e., a non-canary API gateway module, that initiates a subscription of the message topic data 16 comprising the update message data 14. In one embodiment, the message topic module ensures that all API gateway modules 18B and 18C through 18N, except the API gateway module 18A that had delivered the update message data to the message topic module, can initiate a subscription of the message topic data 16 comprising the update message data 14. In one embodiment, in response to an API gateway module 18B and 18C through 18N initiating a subscription of the message topic data 16 comprising the update message data 14, the message topic module delivers the update message data 14 to the subscribing API gateway module 18B and 18C through 18N as subscribed topic data. In one embodiment, any number of API gateway modules 18B and 18C through 18N can initiate a subscription of the message topic data 16 comprising the update message data 14.

In one embodiment, when API gateway modules 18 receive update message data 14, whether from the message queue module or from the message topic module, the API gateway modules 18 deploy an update based on the update message data 14. In one embodiment, deployment modules of the API gateway modules 18 deploy an update. In one embodiment, the update of the API gateway modules 18 is an update to the metadata of the API gateway modules 18. In one embodiment, the update message data 14 provides a reference to a registry module that includes registry data. In one embodiment, the registry data includes a persistent store of update metadata to be updated to the API gateway modules 18. In one embodiment, the update message data 14 provides a reference to the registry data associated with the respective update metadata to be updated to the API gateway modules 18.

As noted above, traditionally the updates to API gateway modules 18 were conducted by a release orchestration tool. Traditionally, a release orchestration tool executed jobs, and a job would be to update a fleet of API gateway modules 18. Traditionally, in order to update the complete fleet of API gateway modules 18, the release orchestration tool would be required to maintain the state of each of the API gateway modules 18 in the fleet, so that the job of performing an update can be accomplished on each of the API gateway modules 18 in the fleet. Consequently, the traditional release orchestration tool was inefficient because the release orchestration tool required maintenance of the state of each of the API gateway modules 18 in a fleet to properly perform the job.

To address this long standing technical problem, the disclosed message broker module makes update message data 14 available to a plurality of API gateway modules 18 without needing to know the state of each of those API gateway modules 18. As discussed herein, the disclosed API gateway modules 18 are configured to be able to initiate a pull of message queue data 12 for when the first API gateway module 18A is acting as a canary, and to be able to initiate a subscription of message topic data 16 for when the API gateway modules 18B and 18C through 18N are acting as a non-canary.

As noted above, traditionally the release orchestration tool would require that the state of each of the API gateway modules 18 be maintained by the release orchestration tool. Traditionally, this requirement led to inefficiencies in implementing additional API gateway modules 18 into an API service system. The increased time to add API gateway modules 18 and increased error conditions when incorrect states of the API gateway modules 18 would be maintained. Such maintenance of states was traditionally required by a release orchestration tool because an update release would need to be staged in phases in which a portion of a fleet of API gateway modules 18 would be allocated to a phase, all the API gateways modules 18 of the phase would be brought off-line, the update would be performed on those API gateway modules 18, and then the API gateway modules 18 would be brought back on-line. Traditionally, such phases, with their corresponding taking API gateway modules 18 off-line, traditionally resulted in a degradation in API service availability.

To address this long standing technical problem, the disclosed message broker module makes update message data 14 available to a plurality of API gateway modules 18 without any of the API gateway modules 18 needing to be taken off-line. As discussed herein, the disclosed API gateway modules 18 are configured to each be able to initiate a pull of message queue data 12 for when the API gateway module 18A is acting as a canary, and to be able to initiate a subscription of message topic data 16 for when the API gateway module 18B and 18C through 18N is acting as a non-canary.

As noted above, traditionally a release orchestration tool would stage updates to a fleet of API gateway modules 18 in phases. For example, a fleet of API gateway modules 18 may be divided into four groups for four phases, and during each phase, a respective one of the four groups would be unavailable during the phase. Traditionally, due to such unavailability, the phases orchestrated by a release orchestration tool would be done on a periodic basis of a batch of updates, such as once a day. Even though an engineer may have had an update immediately ready to be deployed to the fleet of API gateway modules 18, traditionally the engineer's update would not be deployed until the scheduled batch update is launched. Such a delay traditionally caused inefficiencies within an API service system as the updates were delayed in their deployment. To address this long standing technical problem, the disclosed message broker module makes update message data 14 available to the API gateway modules 18 on a real-time basis, allowing for each update to be deployed after the message broker module receives update message data 14 from an engineer system.

As noted above, traditionally a release orchestration tool would designate which API gateway modules 18 would be designated for which phase. Traditionally, the release orchestration tool determined which API gateway modules 18 would be updated in the first phase and centrally determined the phase deployment based on a maintenance of API gateway module state. Such central designation of API gateway modules 18 was prone to error as the record of API gateway module states was traditionally inconsistent, resulting in a fragile deployment of updates and inefficiencies due to increased failure rates of the updates.

To address this long standing technical problem, the disclosed API gateway modules 18 each determine their own availability to serve either as a canary API gateway module 18A or as a non-canary API gateway module of the API gateway modules 18B and 18C through 18N. In one embodiment of the disclosed API gateway modules 18, each API gateway module is capable of receiving update message data 14 either as pulled message queue data 12 or as subscribed message topic data 16 in a decentralized fashion. Further, any additional API gateway modules 18 can be added to the API service system by including with the API gateway modules 18 the capability of receiving update message data 14 both as pulled message queue data 12 and as subscribed message topic data 16.

Embodiments of the present disclosure provide highly efficient, effective, and versatile systems and methods for self-orchestrated canary release deployment within an API gateway architecture. However, the disclosed embodiments do not encompass, embody, or preclude other forms of innovation in the area of API service systems.

In addition, the disclosed embodiments of systems and methods for self-orchestrated canary release deployment within an API gateway architecture are not abstract ideas for at least several reasons.

First, the disclosed systems and methods for self-orchestrated canary release deployment within an API gateway architecture are not abstract ideas because they are not merely an idea itself (e.g., can be performed mentally or using pen and paper). For example, it is not possible for the human mind to comprehend and validate all of the possible update messages that need to be transmitted to all of the possible API gateway modules with all of their respective current metadata configurations in relative real-time deployment, even with pen and paper to assist the human mind.

In contrast, the disclosed embodiments receive update message data and first transmit the update message data to an API gateway module indicating, via a point-to-point messaging model, its availability to deploy the update acting as a canary API gateway module, and second transmit the update message data to a plurality of API gateway modules indicating, via a publish-and-submit messaging model, their availability to deploy the update acting as non-canary API gateway modules.

Second, the disclosed systems and methods for self-orchestrated canary release deployment within an API gateway architecture are not abstract ideas because they are not a fundamental economic practice (e.g., are not merely creating a contractual relationship, hedging, mitigating a settlement risk, etc.).

In contrast, the disclosed embodiments provide for updating a plurality of API gateway modules in a real-time manner utilizing a de-centralized process of a point-to-point messaging model and a subscribe-and-publish messaging model. This allows the API gateway modules to receive updates near real-time without having to take an API gateway module off-line, which provides an improved experience for API consumers of the API services. In addition, embodiments of the present disclosure allow for reduced use of processor cycles, memory, bandwidth, and power consumption associated with self-orchestrated canary release deployment within an API gateway architecture, compared to an approach utilizing a release orchestration tool. In one embodiment, the reduced use of memory of the present disclosure is achieved through the absence of a traditional release orchestration tool that required memory to store the states of a number of API gateway modules. In one embodiment, the reduced use of processor cycles of the present disclosure is achieved through the absence of a traditional release orchestration tool that required processor cycles to monitor the states of a number of API gateway modules.

Third, the disclosed systems and methods for self-orchestrated canary release deployment within an API gateway architecture are not abstract ideas because they are not a method of organizing human activity (e.g., managing a game of bingo), but are rather, in one embodiment, tools for enabling engineers to continually deploy updates to a number of API gateway modules to provide a facade to one or more API service modules that provide API services to API consumers.

In addition, using the disclosed embodiments, an API service system is provided that significantly improves the field of update deployment to API gateway modules by enabling near real-time deployment of an update without any API gateway module needing to be taken off-line, according to one embodiment. Therefore, both human and non-human resources are utilized more efficiently.

Fourth, although mathematics may be used in the disclosed systems and methods for self-orchestrated canary release deployment within an API gateway architecture, the disclosed and claimed systems and methods, are not abstract ideas because they are not simply a mathematical relationship/formula.

In contrast, the disclosed embodiments provide for updating a plurality of API gateway modules in a real-time manner utilizing a de-centralized process of a point-to-point messaging model and a subscribe-and-publish messaging model. This results in the tangible effect of the continued functioning, through the API gateway modules, of a complex computing system comprising an API service system. In addition, using the disclosed embodiments, an API service system is provided that increases loyalty to the API services being provided because users of the API consumer systems find the API consumer systems to be more reliable. This results in repeat customers of the API consumer systems, and reduced abandonment of use of applications associated with the API consumer systems, according to one embodiment.

Exemplary Environment

Figure 1B:
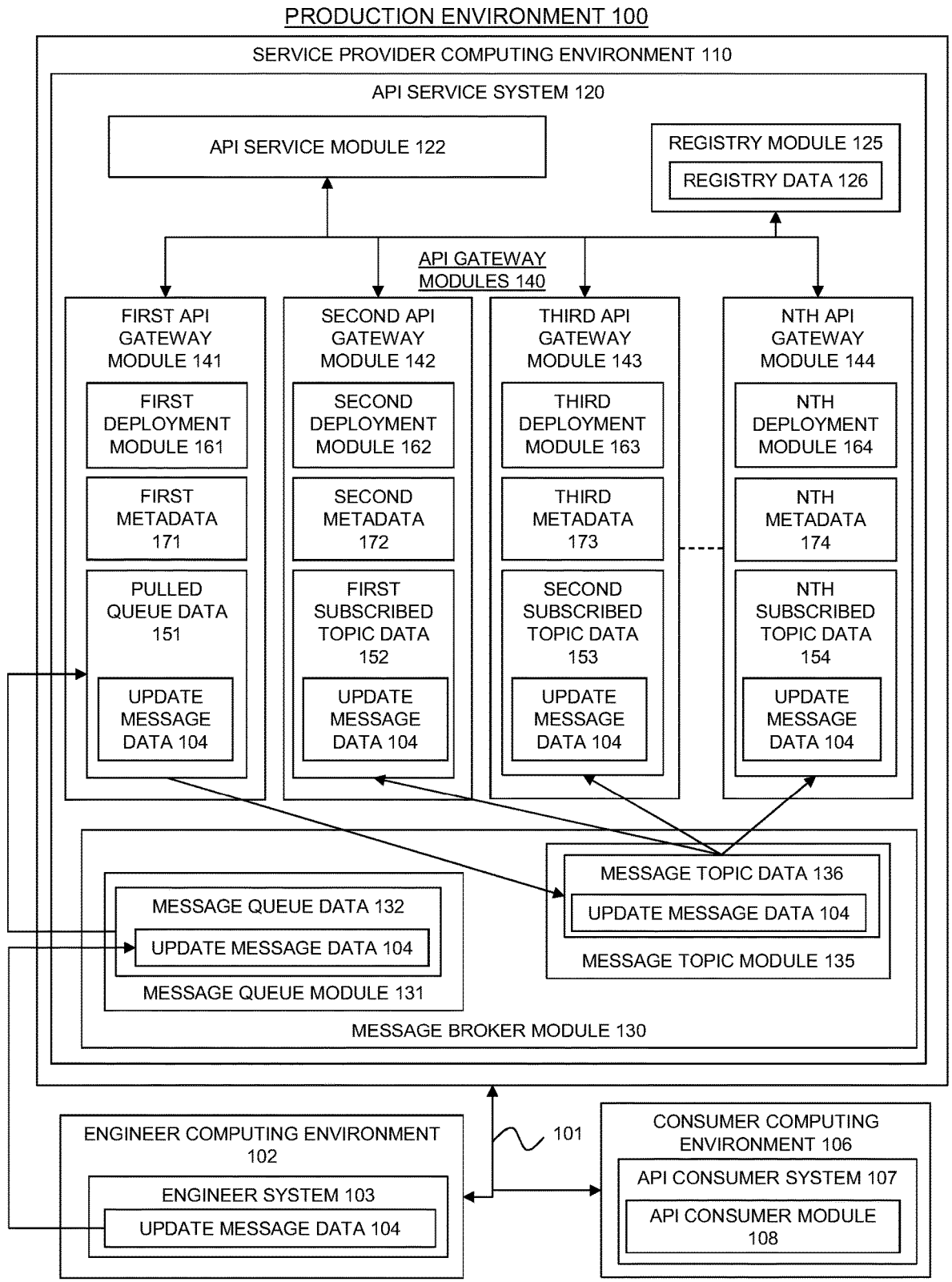
FIG. 1B is a functional block diagram of a production environment for self-orchestrated canary release deployment within an API gateway architecture, in accordance with one embodiment.

FIG. 1B is a functional block diagram of a production environment 100 for self-orchestrated canary release deployment within an API gateway architecture, in accordance with one embodiment. It is to be understood that certain elements of FIG. 1B correspond to respective elements of FIG. 1A and may be used interchangeably when referring to FIGS. 1A and 1B. Referring to FIGS. 1A and 1B together, the update message data 104 of FIG. 1B corresponds to the update message data 14 of FIG. 1A, the message queue data 132 of FIG. 1B corresponds to the message queue data 12 of FIG. 1A, the message topic data 136 of FIG. 1B corresponds to the message topic data 16 of FIG. 1A, the first API gateway module 141 of FIG. 1B corresponds to the first API gateway module 18A of FIG. 1A, the second API gateway module 142 of FIG. 1B corresponds to the second API gateway module 18B of FIG. 1A, the third API gateway module 143 corresponds to the third API gateway module 18C of FIG. 1A, and the nth API gateway module 144 of FIG. 1B corresponds to the nth API gateway module 18N of FIG. 1A. It is to be further understood that the API gateway modules 141, 142, and 143 through 144 depicted as a plurality of API gateway modules 140 of FIG. 1B collectively correspond to the API gateway modules 18 of FIG. 1A.

Referring to FIGS. 1A and 1B together, in one embodiment, the production environment 100 includes a service provider computing environment 110, an engineer computing environment 102, and a consumer computing environment 106. In one embodiment, the computing environments 110, 102, and 106 are communicatively coupled to each other with one or more communication channels 101. In one embodiment, the communication channels 101 include one or more physical or virtual networks such as any network discussed herein, and/or as known in the art at the time filing, and/or as becomes available after the time of filing.

According to one embodiment, the service provider computing environment 110 represents one or more computing systems, such as one or more servers and/or distribution centers, that are configured to receive, execute, and host one or more API service systems for access by one or more consumers of services, according to one embodiment. Furthermore, the service provider computing environment 110 represents one or more computing systems that are configured to receive, execute, and host one or more data management systems (e.g., applications) for access by one or more users, according to one embodiment. The service provider computing environment 110 can be a traditional data center computing environment, a virtual asset computing environment (e.g., a cloud computing environment), or a hybrid between a traditional data center computing environment and a virtual asset computing environment, according to various embodiments.

According to one embodiment, the service provider computing environment 110 includes an API service system 120. It is to be understood that the service provider computing environment 110 may have any number of such systems. It is also to be understood that one or more API service systems 120 may reside in its/their own computing environment that is separate from the service provider computing environment 110. For example, a service provider may host one API service system 120 on its premises and another API service system 120 on a third-party's premises or in the cloud.

Although not shown, in one embodiment, the service provider computing environment 110 includes a data management system. In one specific illustrative example, the data management system is a financial data management system. In one embodiment, the data management system may be a consumer of the API services provided by the API service system 120.

Although not shown, in one embodiment, the production environment 100 includes a user computing environment that includes a user system. In one embodiment, the users of a data management system utilize the user computing environments to interact with the data management system.

In one embodiment, the API service system 120 includes an API service module 122, a plurality of gateway modules 141, 142, and 143 through 144 (collectively 140), a registry module 125, and a message broker module 130. In one embodiment, the API service module 122 comprises a plurality of APIs that provide respective services. In one embodiment, there are a plurality of API service modules 122, and each API service module 122 comprises a plurality of APIs. In this embodiment, each API service module 122 may comprise the same plurality of APIs, some of the same plurality of APIs, and/or different pluralities of APIs. In one embodiment, two or more APIs of the API service module 122 provide services that are related to a data management system. In one embodiment, such two or more APIs of the API service module 122 form one or more groupings of APIs. Although a single API service module 122 is depicted as residing within the API service system 120, it is to be understood that any number of API service modules 122 may reside in any number of API service systems 120. In one embodiment, each API of the API service module 122 comprises an endpoint that provides an entry to the API for an API consumer.

In one embodiment, a plurality of API gateway modules 140 expose each API endpoint of the API service module 122 by being a proxy for the respective API, thereby creating a facade of endpoints for an API consumer to consume the service offered by each API. FIG. 1B depicts a first API gateway module 141, a second API gateway module 142, and a third API gateway module 143 through an nth API gateway module 144. It is to be understood that such API gateway modules 141, 142, and 143 through 144 are representative of a plurality of API gateway modules 140, including the nth API gateway module 144 representing any number of API gateway modules. Although the API gateway modules 140 are depicted as residing in the API service system 120, it is to be understood that any number of API gateway modules 140 may reside in any number of API service systems 120. Furthermore, any number of API gateway modules 140 may serve as a facade for any number of API service modules 122 residing in any number of API service systems 120 communicatively coupled with the communication channels 101. In one embodiment, the API gateway modules 140 provide a facade of API services of the API service modules 122, and the facade enables the API gateway modules 140 to receive requests from an API consumer for an exposed API of the API service module 122, to route requests to an appropriate API of the API service module 122, to route API responses from the appropriate API of the API service module 122, to enforce security of each request, to perform traffic manipulation such as performing rate limiting on calls to an API of the API service module 122, and to perform other API gateway policies as discussed herein, or as known in the art at the time of filing, or as developed, or becomes available, after the time of filing.

In one embodiment, an API consumer, such as a device or application, consumes API services of the API service module 122. In one embodiment, the consumer computing environment 106 includes an API consumer system 107. It is to be understood that while only one consumer computing environment 106 is depicted, any number of consumer computing environments 106 may be included in the production environment 100, for any number of API consumers. It is to be further understood that while only one API consumer system 107 is depicted, any number of API consumer systems 107 may be included with any number of consumer computing environments 106. In one embodiment, the API consumer system 107 includes an API consumer module 108. It is to be understood that while only one API consumer module 108 is depicted, any number of API consumer modules 108 may be included in any number of API consumer systems 107.

In one embodiment, an API consumer module 108 consumes an API service of the API service module 122 via an API gateway module of the API gateway modules 140. In one embodiment, the API consumer module 108 transmits a request to one of the API gateway modules 140 utilizing a proxy endpoint of an API, and that one of the API gateway modules 140 transmits the request to the API service module 122. In this embodiment, the API service module 122 transmits a response to the applicable API gateway module of the API gateway modules 140, which further transmits the response back to the API consumer module 108.

In one embodiment, the API gateway modules 141, 142, and 143 through 144 include respective metadata 171, 172, and 173 through 174 that include configuration information for the respective API gateway module 141, 142, and 143 through 144. In one embodiment, the respective metadata 171, 172, and 173 through 174 includes configuration information for the respective one of the API gateway modules 140 to be a proxy for an API of the API service module 122. In one embodiment, the respective metadata 171, 172, and 173 through 174 is required to be updated. In one embodiment, the data for an update is provided by registry data 126 of the registry module 125. In one embodiment, a respective deployment module 161, 162, and 163 through 164 of the API gateway modules 140 deploys the update of the registry data 126 to the respective metadata 171, 172, and 173 through 174.

As a specific illustrative example, an API service module 122 may reside on a server with a first domain name server (DNS) to which one of the API gateway modules 140 routes based on the respective metadata 171, 172, and 173 through 174. In this example, if the server is changed to a second DNS, then an engineer may utilize the engineer system 103 to update the registry data 126 to replace the reference to the first DNS with a reference to the second DNS for the applicable API service module 122. In this example, after one of the API gateway modules 140 receives update message data 104, whether as message queue data 132 or message topic data 136, the respective deployment module 161, 162, and 163 through 164 updates the respective metadata 171, 172, and 173 through 174 with the second DNS from the registry data 126 that was referenced by the update message data 104. In this example, after the update to the respective metadata 171, 172, and 173 through 174, the applicable one of the API gateway modules 140 will route consumer requests to the applicable API service module 122 based on the second DNS that was updated in the respective metadata 171, 172, and 173 through 174.

As a further specific illustrative example, an API service module 122 may utilize a version one of an OAuth protocol, which one of the API gateway modules 140 enforces when receiving requests from an API consumer module 108. In this example, if the API service module 122 changes its protocol to version two of OAuth, then an engineer may utilize the engineer system 103 to update the registry data 126 to replace the reference to version one of the OAuth protocol with a reference to version two of the OAuth protocol for the applicable API service module 122. In this example, after one of the API gateway modules 140 receives update message data 104, whether as message queue data 132 or message topic data 136, the respective deployment module 161, 162, and 163 through 164 updates the respective metadata 171, 172, and 173 through 174 with the version two of the OAuth protocol from the registry data 126 that was referenced by the update message data 104. In this example, after the update of the respective metadata 171, 172, and 173 through 174, the applicable one of the API gateway modules 140 will enforce version two of the OAuth protocol for consumer requests to the applicable API service module based on the update to the respective metadata 171, 172, and 173 through 174.

In one embodiment, an engineer utilizes an engineer system 103 of the engineer computing environment 102 to provide the registry data 126 that is utilized by the respective deployment module 161, 162, and 163 through 164 of the API gateway modules 140. It is to be understood that while one engineer computing environment 102 is depicted, there may be any number of engineer computing environments 102. It is to be further understood that while only one engineer system 103 is depicted, there can be any number of engineer systems 103 included in any number of engineer computing environments 102. In one embodiment, after an engineer enables registry data 126 comprising updated configuration data to be available to the API gateway modules 140, the engineer alerts the API gateway modules 140 with an update message data 104 via the message broker module 130.

In one embodiment, update message data 104 is transmitted from the engineer system 103 to a message queue module 131 of the message broker module 130. In one embodiment, the update message data 104 includes a reference to associated configuration data represented in the registry data 126 of the registry module 125. In one embodiment, the message queue module 131 operates under a point-to-point messaging model. In one embodiment, the message queue module 131 receives the update message data 104 from the engineer system 103 and stores the update message data 104 as message queue data 132. It is to be understood that any of the API gateway modules 141, 142, or 143 through 144 is capable of initiating a pull of the message queue data 132, and the depiction of the first API gateway module 141 as initiating such a pull is for illustrative purposes. In one embodiment, the update message data 104 is held in the message queue data 132 until the first API gateway module 141 initiates a pull of the message queue data 132 comprising the update message data 104. In one embodiment, the message queue module 131 prevents any other API gateway module or the API gateway modules 142 and 143 through 144 from initiating a second pull of the message queue data 132 comprising the update message data 104. In one embodiment, the message queue module 131 accomplishes such prevention by removing the update message data 104 from the message queue data 132. In one embodiment, in response to the first API gateway module 141 initiating a pull of the message queue data 132 comprising the update message data 104, the message queue module 131 transmits the message queue data 132 comprising the update message data 104 to the first API gateway module 141 which stores the message queue data 132 as pulled queue data 151 comprising the update message data 104.

In one embodiment, two or more engineers transmit update message data 104 from the engineer system 103 to the message queue module 131. For example, a first engineer may implement a first configuration update to the registry data 126 and transmit first update message data 104 related to the first configuration update to the message queue module 131. In this example, a second engineer may implement a second configuration update to the registry data 126 and transmit second update message data 104 related to the second configuration update to the message queue module 131. In this example, the message queue module 131 stores the first update message data 104 as first message queue data 132 and stores the second update message data 104 as second message queue data 132. Of the plurality of API gateway modules 140, one of them will be the first to initiate a pull of the message queue data 132 comprising the first update message data 104 and act as the first API gateway module 141, and thereafter the message queue module 131 prevents all other API gateway modules 142 and 143 through 144 from initiating such a pull in relation to the first update message data 104. Similarly in this example, of the plurality of API gateway modules 140, one of them will be the first to initiate a pull of the message queue data 132 comprising the second update message data 104 and act as the first API gateway module 141, and thereafter the message queue module 131 prevents all other API gateway modules 142 and 143 through 144 from initiating such a pull in relation to the second update message data 104. It is to be understood from this example that any API gateway module of the API gateway modules 140 can be a first API gateway module 141 by being the first to initiate a pull of message queue data 132 comprising the update message data 104. It is also to be understood from this example that only one API gateway module of the API gateway modules 140 is permitted by the message queue module 131 to be the first API gateway module 141 for any one instance of update message data 104.

In one embodiment, a single first API gateway module 141 receives the message queue data 132 comprising the update message data 104. In one embodiment, the first API gateway module 141 receives the message queue data 132 comprising the update message data 104, and stores such as pulled queue data 151 comprising the update message data 104. In one embodiment, a first deployment module 161 of the first API gateway module 141 deploys the update associated with the update message data 104. In one embodiment, the registry data 126 comprises such an update, and the update message data 104 is associated with the applicable update of registry data 126. In one embodiment, the first deployment module 161 applies the update to the first metadata 171. In one embodiment, an update to the first metadata 171 is a configuration change to the first API gateway module 141.

In this specific illustrative example, the first API gateway module 141 acts as a canary API gateway module because it is the first API gateway module to deploy the update within the production environment 100. In one embodiment, the first deployment module 161 tests the update of the first metadata 171. In one embodiment, the first deployment module 161 tests that the first metadata 171 has data integrity. For example, the first metadata 171 may contain a hash map and the first deployment module 161 may determine that the keys of the hash map are scoped correctly. In one embodiment, the first deployment module 161 tests that the first metadata 171 routes to the API service module 122 correctly. For example, a smoke test may be performed to determine that a request is properly responded to by the API service module 122.

In one embodiment, if a test of an update performed by the first deployment module 161 fails, then the update is uninstalled from the first API gateway module 141, and a failure message is transmitted to the engineer system 103 via the message broker module 130. It is to be understood that an unsuccessful deployment of an update by the first API gateway module 141 avoids the system-wide introduction of a failed update to other API gateway modules 142 and 143 through 144. In one embodiment, if a test of an update performed by the first deployment module 161 succeeds, then the update message data 104 is transmitted to the other API gateway modules 142 and 143 through 144 via the message broker module 130.

In one embodiment, after a successful deployment of an update by the first API gateway module 141 acting as a canary API gateway module, the first API gateway module 141 transmits the pulled queue data 151 comprising the update message data 104 to the message topic module 135 of the message broker module 130. In one embodiment, the update message data 104 includes a reference to associated configuration data represented in the registry data 126 of the registry module 125. In one embodiment, the message topic module 135 operates under a publish-and-subscribe messaging model. In one embodiment, the message topic module 135 receives the pulled queue data 151 comprising the update message data 104 from the first API gateway module 141 and stores the update message data 104 as message topic data 136. In one embodiment, the message topic data 136 comprising the update message data 104 is available to be delivered to any API gateway modules 142 and 143 through 144 that was not a first API gateway module 141 that had acted as a canary API gateway module with respect to the update message data 104.

In one embodiment, a second API gateway module 142 initiates a subscription of the message topic data 136 comprising the update message data 104. In one embodiment, in response to the second API gateway module 142 initiating a subscription of the message topic data 136 comprising the update message data 104, the message topic module 135 delivers the message topic data 136 comprising the update message data 104 to the second API gateway module 142. In one embodiment, the second API gateway module 142 receives the message topic data 136 comprising the update message data 104, and stores such as first subscribed topic data 152 comprising the update message data 104. In one embodiment, a second deployment module 162 of the second API gateway module 142 deploys the update associated with the update message data 104. In one embodiment, the registry data 126 comprises such an update, and the update message data 104 is associated with the applicable update of the registry data 126. In one embodiment, the second deployment module 162 applies the update to the second metadata 172. In one embodiment, an update to the second metadata 172 is a configuration change to the second API gateway module 142.

In one embodiment, a third API gateway module 143 initiates a subscription of the message topic data 136 comprising the update message data 104. In one embodiment, in response to the third API gateway module 143 initiating a subscription of the message topic data 136 comprising the update message data 104, the message topic module 135 delivers the message topic data 136 comprising the update message data 104 to the third API gateway module 143. In one embodiment, the third API gateway module 143 receives the message topic data 136 comprising the update message data 104, and stores such as second subscribed topic data 153 comprising the update message data 104. In one embodiment, a third deployment module 163 of the third API gateway module 143 deploys the update associated with the update message data 104. In one embodiment, the registry data 126 comprises such an update, and the update message data 104 is associated with the applicable update of the registry data 126. In one embodiment, the third deployment module 163 applies the update to the third metadata 173. In one embodiment, an update to the third metadata 173 is a configuration change to the third API gateway module 143.

It is to be understood that any API gateway module, including the nth API gateway module 144, may initiate a subscription of the message topic data 136 comprising the update message data 104. In one embodiment, an nth API gateway module 144 initiates a subscription of the message topic data 136 comprising the update message data 104. In one embodiment, in response to the nth API gateway module 144 initiating a subscription of the message topic data 136 comprising the update message data 104, the message topic module 135 delivers the message topic data 136 comprising the update message data 104 to the nth API gateway module 144. In one embodiment, the nth API gateway module 144 receives the message topic data 136 comprising the update message data 104, and stores such as nth subscribed topic data 154 comprising the update message data 104. In one embodiment, an nth deployment module 164 of the nth API gateway module 144 deploys the update associated with the update message data 104. In one embodiment, the registry data 126 comprises such an update, and the update message data 104 is associated with the applicable update of the registry data 126. In one embodiment, the nth deployment module 164 applies the update to the nth metadata 174. In one embodiment, an update to the nth metadata 174 is a configuration change to the nth API gateway module 144.

It is to be understood that, in one embodiment, the first API gateway module 141 is prevented from initiating a subscription of the message topic data 136 because it has already deployed the update represented by the update message data 104. In one embodiment, the message topic module 135 associates the first API gateway module 141 with the message topic data 136 to indicate that the first API gateway module 141 had acted as a canary gateway module and is precluded from initiating a subscription of the message topic data comprising the update message data 104.

In one embodiment, the message topic module 135 ensures that all API gateway modules 142 and 143 through 144, except the first API gateway module 141 that had delivered the update message data 104 to the message topic module 135, can initiate a subscription of the message topic data 136 comprising the update message data 104. In one embodiment, in response to one of the API gateway modules 142 and 143 through 144 initiating a subscription of the message topic data 136 comprising the update message data 104, the message topic module 135 delivers the message topic data 136 comprising the update message data 104 to the respective subscribing API gateway module of the API gateway modules 142 and 143 through 144.

In one embodiment, the second API gateway module 142 stores the message topic data 136 comprising the update message data 104 as first subscribed topic data 152 comprising the update message data 104 and performs an update of the second metadata 172 with the second deployment module 162. In one embodiment, the third API gateway module 143 stores the message topic data 136 comprising the update message data 104 as second subscribed topic data 153 comprising the update message data 104 and performs an update of the third metadata 173 with the third deployment module 163. In one embodiment, the nth API gateway module 144 stores the message topic data 136 comprising the update message data 104 as nth subscribed topic data 154 comprising the update message data 104 and performs an update of the nth metadata 174 with the nth deployment module 164. It is to be understood that any number of nth API gateway modules 144 acting as non-canary gateway modules 144 may initiate a subscription of the message topic data 136 comprising the update message data 104.

Figure 2:
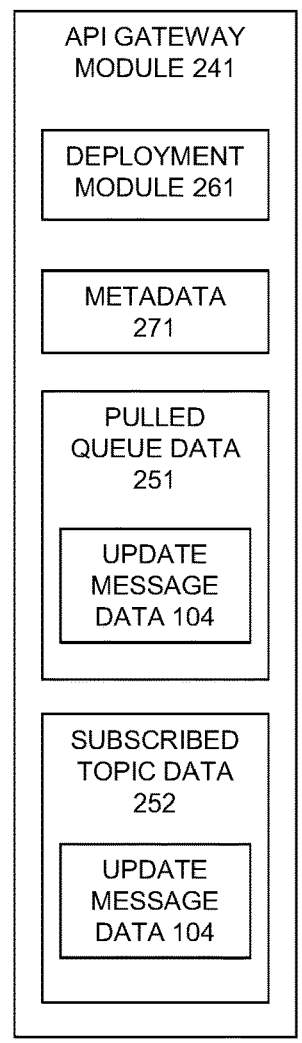
FIG. 2 is a functional block diagram of an illustrative API gateway module for self-orchestrated canary release deployment within an API gateway architecture, in accordance with one embodiment.

FIG. 2 is a functional block diagram of an illustrative API gateway module 200 for self-orchestrated canary release deployment within an API gateway architecture, in accordance with one embodiment. Referring to FIGS. 1A, 1B, and 2 together, the API gateway module 241 may be stipulated to be one of API gateway modules 18A, 18B, 18C through 18N, 141, 142, and 143 through 144. In one embodiment, the illustrative API gateway module 241 includes a deployment module 261 with which updates based on the registry data 126 can be applied to metadata 271.

In one embodiment, the API gateway module 241 acts as a canary API gateway module and receives message queue data 132 comprising the update message data 104, and stores such as pulled queue data 251 comprising the update message data 104. In this embodiment, the subscribed topic data 252 is not utilized. It is to be understood that FIG. 1B depicts the first API gateway module 141 without subscribed topic data because it is acting as a canary API gateway module, nevertheless it is capable of acting as a non-canary as depicted with the API gateway module 241.

In one embodiment, the API gateway module 241 acts as a non-canary API gateway module and receives message topic data 136 comprising the update message data 104, and stores such as subscribed topic data 252 comprising the update message data 104. In this embodiment, the pulled queue data 251 is not utilized. It is to be understood that FIG. 1B depicts the second API gateway module 142 and the third API gateway module 143 through the nth API gateway module 144 without pulled queue data because it is acting as a non-canary API gateway module, nevertheless they are each capable of acting as a canary as depicted with the API gateway module 241.

Exemplary Process

Figure 3A:
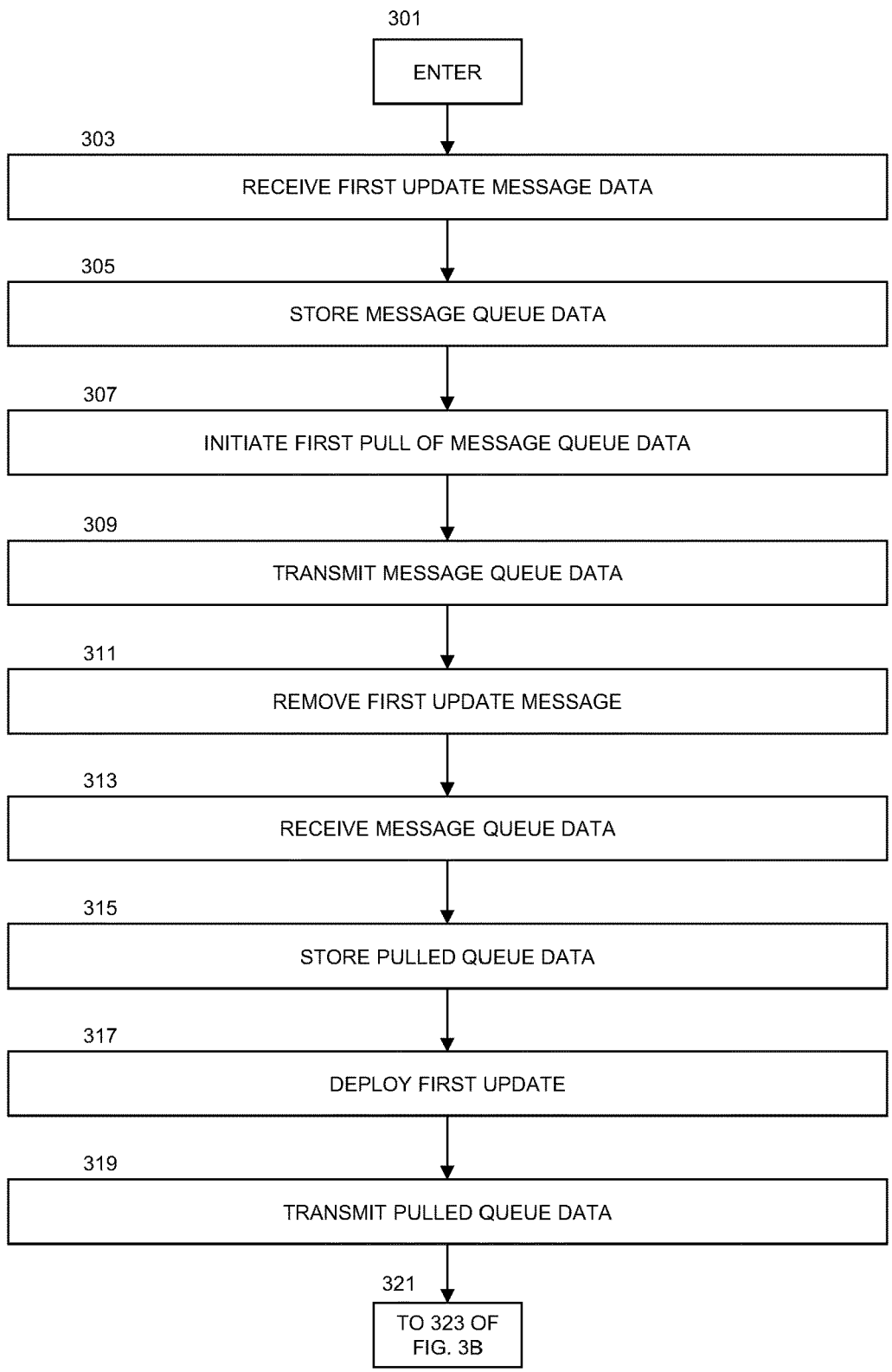
FIGS. 3A and 3B are flow diagrams of a process for self-orchestrated canary release deployment within an API gateway architecture, in accordance with one embodiment.
Figure 3B:
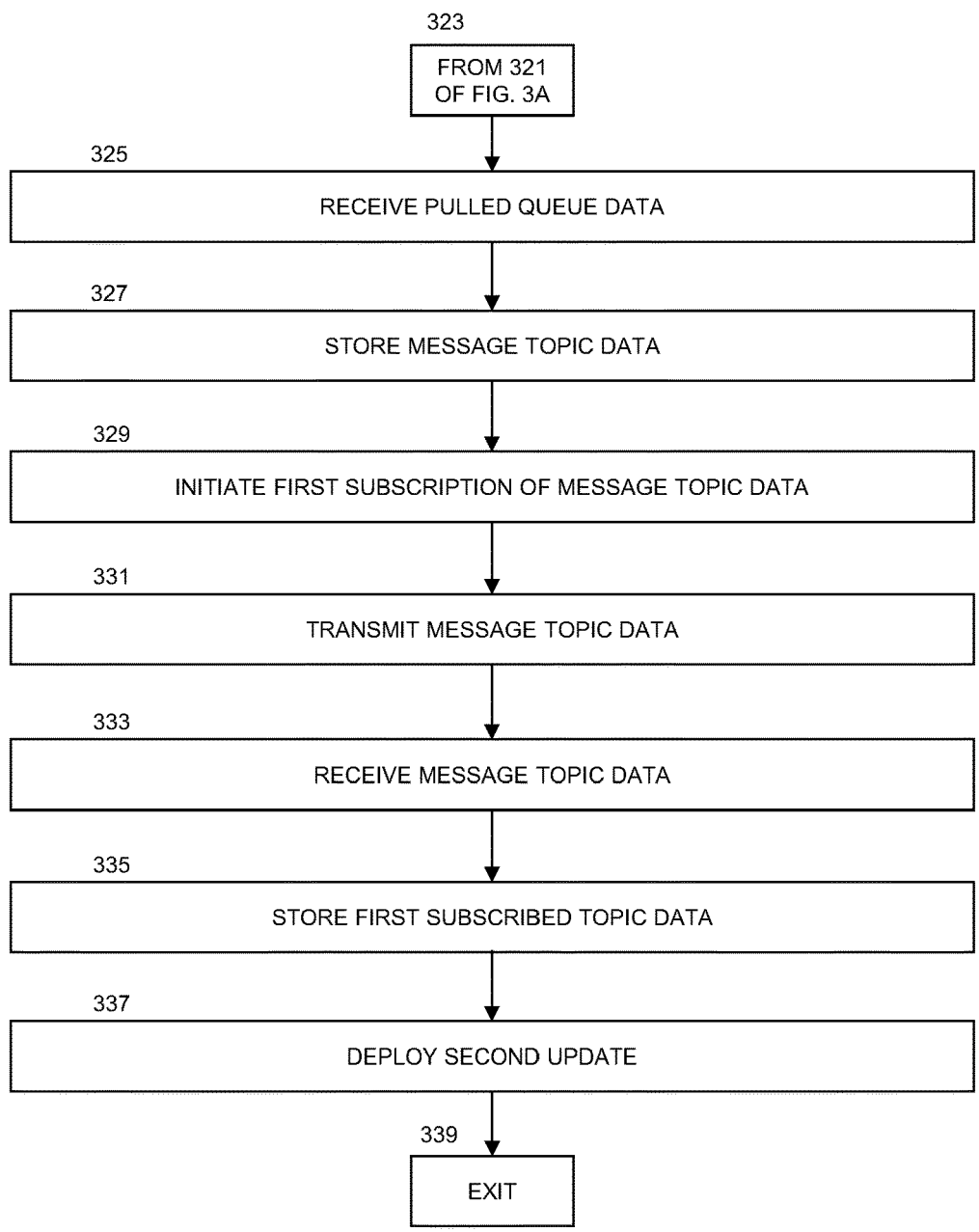

FIGS. 3A and 3B are flow diagrams of a process 300 for self-orchestrated canary release deployment within an API gateway architecture, in accordance with one embodiment. Referring to FIGS. 1B, 2, 3A, and 3B together, the process 300 for self-orchestrated canary release deployment within an API gateway architecture begins at ENTER OPERATION 301 and process flow proceeds to RECEIVE FIRST UPDATE MESSAGE DATA OPERATION 303.

In one embodiment, at RECEIVE FIRST MESSAGE DATA OPERATION 303, the message queue module 131 of the message broker module 130 receives first update message data 104. In one embodiment, the engineer system 103 of the engineer computing environment 102 transmits the first update message data 104 to the message queue module 131. In one embodiment, an engineer utilizes the engineer system 103 to generate the update message data 104. In one embodiment, the engineer system 103 is utilized by an engineer to add update configuration data to the registry data 126 of the registry module 125. In one embodiment, the first update message data 104 references the update configuration data of the registry data 126. In one embodiment, the first update message data 104 is a notification that update configuration data is available within the registry data 126. In one embodiment, the update configuration data of the registry data 126 is deployable to at least one API gateway module 241. In one embodiment, the deployment module 261 of the API gateway module 241 deploys the update configuration data of the registry data 126 as an update to the metadata 271.

In one embodiment, once the message queue module 131 of the message broker module 130 receives the first update message data 104 at RECEIVE FIRST UPDATE MESSAGE DATA OPERATION 303, process flow proceeds to STORE MESSAGE QUEUE DATA OPERATION 305.

In one embodiment, at STORE MESSAGE QUEUE DATA OPERATION 305, the message queue module 131 of the message broker module 130 stores the first update message data 104 from the engineer system 103 as message queue data 132 comprising the first update message data 104. In one embodiment, the message queue module 131 provides the message queue data 132 as a staging area that contains messages, such as update message data 104, that have been sent by a sender and are waiting to be read by only one receiver. It is to be understood that the term queue is not meant to limit the receipt of messages to an order in which the messages were sent. In one embodiment, the message queue module 131 guarantees that each update message data 104 is delivered to only one receiver, such as the first API gateway module 141.

In one embodiment, once the message queue module 131 stores the first update message data 104 as the message queue data 132 comprising the first update message data 104 at STORE MESSAGE QUEUE DATA OPERATION 305, process flow proceeds to INITIATE FIRST PULL OF MESSAGE QUEUE DATA OPERATION 307.

In one embodiment, at INITIATE FIRST PULL OF MESSAGE QUEUE DATA OPERATION 307, the first API gateway module 141 of a plurality of API gateway modules 241 initiates a first pull of the message queue data 132 comprising the first update message data 104. In one embodiment, the first API gateway module 141 initiates the first pull from the message queue module 131. In one embodiment, the message queue module 131 conforms to a point-to-point messaging model. In one embodiment, a point-to-point messaging model routes messages from a sender to a single receiver. In one embodiment, a point-to-point messaging model implements the maintenance of a queue of messages, such as the message queue data 132 comprising the first update message data 104. In one embodiment, a single API gateway module 241 is a receiver of an update message data 104. In one embodiment, any API gateway module 241 is capable of initiating a pull of message queue data 132 and thus is capable of performing the role of the first API gateway module 141 as a canary.

In one embodiment, a point-to-point messaging model implements the capability of any number of senders, such as any number of engineer systems 103, to be able to send any number of update message data 104 to the message queue module 131, which holds each update message data 104 until a first API gateway module 141 initiates a pull of the respective update message data 104. In one embodiment, the message queue module 131 ensures that there is only one first API gateway module 141. In one embodiment, the message queue module 131 retains the message queue data 132 comprising the first update message data 104 until a first API gateway module 141 initiates a first pull of the message queue data 132.

In one embodiment, each API gateway module of the plurality of API gateway modules 241 is configured to be an API proxy of at least one API service module 122 for at least one API consumer module 108. In one embodiment, the first API gateway module 141 is a canary API gateway module that initiates a first pull before any other API gateway module of the plurality of API gateway modules 241. In one embodiment, each API gateway module of the plurality of API gateway modules 241 is configured to initiate a plurality of pulls of message queue data 132 from the message queue module 131 of the message broker module 130, wherein the plurality of pulls conforms to a point-to-point messaging model.

In one embodiment, once the first API gateway module 141 initiate a first pull of the message queue data 132 comprising the update message data 104 from the message queue module 131 at INITIATE FIRST PULL OF MESSAGE QUEUE DATA OPERATION 307, process flow proceeds to TRANSMIT MESSAGE QUEUE DATA OPERATION 309.

In one embodiment, at TRANSMIT MESSAGE QUEUE DATA OPERATION 309, the message queue module 131 transmits, to the first API gateway module 141, the message queue data 132 comprising the first update message data 104. In one embodiment, any API gateway module 241 can act as a first API gateway module 141. In one embodiment, a first API gateway module 141 is one of a plurality of API gateway modules 241 that was first of the plurality of API gateway modules 241 to have initiated a first pull of the message queue data comprising the first update message data 104. In one embodiment, the message queue module 131 ensures that only one API gateway module 241 is a first API gateway module 141 for the first update message data 104. In this embodiment, the message queue module 131 ensures that only one API gateway module 241 is a first API gateway module 141 for second update message data 104, which may or may not be the same first API gateway module 141 for the first update message data 104.

In one embodiment, once the message queue module 131 transmits the message queue data 132 comprising the first update message data 104 to the first API gateway module 141 at TRANSMIT MESSAGE QUEUE DATA OPERATION 309, process flow proceeds to REMOVE FIRST UPDATE MESSAGE OPERATION 311.

In one embodiment, at REMOVE FIRST UPDATE MESSAGE OPERATION 311, the message queue module 131 removes the first update message data 104 from the message queue data 132. In one embodiment, the message queue module 131 removes the first update message data 104 from the message queue data 132 before a second API gateway module 142 can initiate a pull of the message queue data 132 comprising the first update message data 104. In one embodiment, the message queue module 131 prevents another API gateway module 241 from initiating a pull of the message queue data 132 comprising the first update message data 104. In one embodiment, after receiving an initiation of a first pull of the message queue data 132 comprising the first update message data 104 from the first API gateway module 141, the message queue module 131 ignores any future initiations of a pull of the message queue data 132 comprising the first update message data 104 received from other API gateway modules 241, such as the second API gateway module 142.

In one embodiment, once the message queue module 131 removes the first update message data 104 from the message queue data 132 at REMOVE FIRST UPDATE MESSAGE OPERATION 311, process flow proceeds to RECEIVE MESSAGE QUEUE DATA OPERATION 313.

In one embodiment, at RECEIVE MESSAGE QUEUE DATA OPERATION 313, the first API gateway module 141 receives the message queue data 132 comprising the first update message data 104.

In one embodiment, once the first API gateway module 141 receives the message queue data 132 comprising the first update message data 104 at RECEIVE MESSAGE QUEUE DATA OPERATION 313, process flow proceeds to STORE PULLED QUEUE DATA OPERATION 315.

In one embodiment, at STORE PULLED QUEUE DATA OPERATION 315, the first API gateway module 141 stores the message queue data 132 comprising the first update message data 104 as pulled queue data 151 comprising the first update message data 104. In one embodiment, the pulled queue data 151 comprising the first update message data 104 is made available to the first deployment module 161 of the first API gateway module 141.

In one embodiment, once the first API gateway module 141 stores the pulled queue data 151 comprising the update message data 104 at STORE PULLED QUEUE DATA OPERATION 315, process flow proceeds to DEPLOY FIRST UPDATE OPERATION 317.

In one embodiment, at DEPLOY FIRST UPDATE OPERATION 317, the first deployment module 161 deploys the first update to the first API gateway module 141 based on the first update message data 104. In one embodiment, the first update is an update to the first metadata 171. In one embodiment, the first update message data 104 is a reference to first registry data 126 of the registry module 125. In one embodiment, the first deployment module 161 updates the first metadata 171 utilizing the first registry data 126. In one embodiment, the first API gateway module 141 acts as a canary in its deployment of the first update message data 104.

In one embodiment, after the first deployment module 161 updates the first metadata 171, the first deployment module 161 tests the deployment for a successful deployment. In one embodiment, the first deployment module 161 tests the first update represented in the first metadata 171. In one embodiment, the first deployment module 161 determines that the first update failed and removes the first update related to the first update message data 104 from the first metadata 171. In one embodiment, the first deployment module 161 determines that the first update succeeded. In one embodiment, upon the deployment module 161 determining a successful deployment, the first API gateway module 141 makes the first update message data 104 available to other API gateway modules 142 and 143 through 144 that are non-canary API gateway modules.

In one embodiment, the first deployment module 161 of the first API gateway module 141 is configured to deploy a first update to the first API gateway module 141 based on the first update message data 104 and to determine the successful deployment of the first update based on at least one test of at least one API service module 122. In one embodiment, the first deployment module 161 of the first API gateway module 141 is configured to retrieve registry data 126 from a registry module 125 based on the first update message data 104 and to deploy the first update based on the registry data 126, wherein the first update message data 104 comprises a reference to the registry data 126.

In one embodiment, once the first deployment module 161 deploys the first update to the first API gateway module 141 at DEPLOY FIRST UPDATE OPERATION 317, process flow proceeds to TRANSMIT PULLED QUEUE DATA OPERATION 319.

In one embodiment, at TRANSMIT PULLED QUEUE DATA OPERATION 319, the first API gateway module 141 transmits the pulled queue data 151 comprising the first update message data 104 to the message topic module 135 of the message broker module 130. In one embodiment, the first gateway module 141 transmits the pulled queue data 151 comprising the first update message data 104 upon a successful deployment of the first update by the first deployment module 161. In one embodiment, upon a determination of a failed deployment of the first update by the first deployment module 161, the pulled queue data 151 comprising the first update message data 104 is not transmitted to the message topic module 135 of the message broker module 130.

In one embodiment, once the first gateway module 141 transmits the pulled queue data 151 comprising the first update message data 104 to the message topic module 135 at TRANSMIT PULLED QUEUE DATA OPERATION 319, process flow proceeds at TO 323 OF FIG. 3B OPERATION 321.

In one embodiment, once process flow proceeds at TO 323 OF FIG. 3B OPERATION 321 of FIG. 3A, process flow proceeds at FROM 321 OF FIG. 3A OPERATION 323 of FIG. 3B.

In one embodiment, once process flow proceeds at FROM 321 OF FIG. 3A OPERATION 323, process flow proceeds to RECEIVE PULLED QUEUE DATA OPERATION 325.

In one embodiment, at RECEIVE PULLED QUEUE DATA OPERATION 325, the message topic module 135 receives the pulled queue data 151 comprising the first update message data 104 from the first API gateway module 141.

In one embodiment, once the message topic module 135 receives the pulled queue data 151 comprising the first update message data 104 from the first API gateway module 141 at RECEIVE PULLED QUEUE DATA OPERATION 325, process flow proceeds to STORE MESSAGE TOPIC DATA OPERATION 327.

In one embodiment, at STORE MESSAGE TOPIC DATA OPERATION 327, the message topic module 135 of the message broker module 130 stores the first update message data 104 from the first API gateway module 141 as message topic data 136 comprising the first update message data 104. In one embodiment, the message topic module 135 provides a distribution mechanism for publishing messages, such as the update message data 104, that are delivered to multiple receivers, such as the second API gateway module 142, the third API gateway module 143, and the nth API gateway module 144.

In one embodiment, once the message topic module 135 of the message broker module 130 stores the first update message data 104 as message topic data 136 comprising the first update message data 104 at STORE MESSAGE TOPIC DATA OPERATION 327, process flow proceeds to INITIATE FIRST SUBSCRIPTION OF MESSAGE TOPIC DATA OPERATION 329.

In one embodiment, at INITIATE FIRST SUBSCRIPTION OF MESSAGE TOPIC DATA OPERATION 329, the second API gateway module 142 initiates a first subscription of the message topic data 136 comprising the first update message data 104 from the message topic module 135. In one embodiment, the second API gateway module 142 is one of a plurality of API gateway modules 241. In one embodiment, the message topic module 135 conforms to a publish-and-subscribe messaging model. In one embodiment, a publish-and-subscribe messaging model implements the publishing of messages, such as the update message data 104, to any number of receivers, including no receivers, one receiver, or a plurality of receivers, such as the API gateway modules 241.

In one embodiment, the publish-and-subscribe messaging model implements the capability of any number of senders, such as any number of first API gateway modules 141, to be able to send any number of update message data 104 to the message topic module 135, which holds each update message data 104 available to any number of other API gateway modules 241 after the update associated with the respective update message data 104 has been tested by the respective first API gateway module 141. In one embodiment, the first update message data 104 is stored as a durable message within the message topic data 136.

In one embodiment, each API gateway module of the plurality of API gateway modules 241 is configured to initiate a plurality of subscriptions of message topic data 136 from the message topic module 135 of the message broker module 130, wherein the plurality of subscriptions conforms to a publish-and-subscribe messaging model. In one embodiment, the message topic data 136 comprising the first update message data 104 further comprises a representation that the first API gateway module 141 transmitted pulled queue data 151 comprising the first update message data 104 to the message topic module 135 of the message broker module 130.

In one embodiment, once the second API gateway module 142 initiates a first subscription of the message topic data 136 comprising the first update message data 104 from the message topic module 135 at INITIATE FIRST SUBSCRIPTION OF MESSAGE TOPIC DATA OPERATION 329, process flow proceeds to TRANSMIT MESSAGE TOPIC DATA OPERATION 331.

In one embodiment, at TRANSMIT MESSAGE TOPIC DATA OPERATION 331, the message topic module 135 transmits, to the second API gateway module 142, the message topic data 136 comprising the first update message data 104. In one embodiment, any API gateway module 241 can act as a second API gateway module 142. In one embodiment, a second API gateway module 142 is one of a plurality of API gateway modules 241 that initiated a subscription of the message topic data 136 comprising the first update message data 104. In one embodiment, the message topic module 135 ensures that the first API gateway module 141 is not a second API gateway module 142 with respect to the first update message data 104. In this embodiment, the second API gateway module 142 may be a first API gateway module 141 with respect to second update message data 104, for example, that originated from a second engineer system 103.

In one embodiment, once the message topic module 135 transmits the message topic data 136 comprising the first update message data 104 to the second API gateway module 142 at TRANSMIT MESSAGE TOPIC DATA OPERATION 331, process flow proceeds to RECEIVE MESSAGE TOPIC DATA 333.

In one embodiment, at RECEIVE MESSAGE TOPIC DATA 333, the second API gateway module 142 receives the message topic data 136 comprising the first update message data 104 from the message topic module 135.

In one embodiment, once the second API gateway module 142 receives the message topic data 136 comprising the first update message data 104 at RECEIVE MESSAGE TOPIC DATA 333, process flow proceeds to STORE FIRST SUBSCRIBED TOPIC DATA OPERATION 335.

In one embodiment, at STORE FIRST SUBSCRIBED TOPIC DATA OPERATION 335, the second API gateway module 142 stores the message topic data 136 comprising the first update message data 104 as first subscribed topic data 152 comprising the first update message data 104. In one embodiment, the first subscribed topic data 152 is made available to the second deployment module 162 of the second API gateway module 142.

In one embodiment, once the second API gateway module 142 stores the first subscribed topic data 152 comprising the first update message data 104 at STORE FIRST SUBSCRIBED TOPIC DATA OPERATION 335, process flow proceeds to DEPLOY SECOND UPDATE OPERATION 337.

In one embodiment, at DEPLOY SECOND UPDATE OPERATION 337, the second deployment module 162 deploys a second update to the second API gateway module 142 based on the first update message data 104. In one embodiment, the second update is an update to the second metadata 172. In one embodiment, the first update message data 104 is a reference to the first registry data 126 of the registry module 125. In one embodiment, the second deployment module 162 updates the second metadata 172 utilizing the first registry data 126. In one embodiment, the second API gateway module 142 acts as a non-canary in its deployment of the first update message data 104.

In one embodiment, once the second API gateway module 142 deploys the second update to the second API gateway module 142 at DEPLOY SECOND UPDATE OPERATION 337, process flow proceeds to EXIT OPERATION 339.

In one embodiment, at EXIT OPERATION 339, the process 300 for self-orchestrated canary release deployment within an API gateway architecture is exited.

In one embodiment, the process 300 for self-orchestrated canary release deployment within an API gateway architecture includes a third API gateway module 143 of the plurality of API gateway modules 241 that initiates a second subscription, from the message topic module 135, of the message topic data 136 comprising the first update message data 104. In one embodiment, the message topic module 135 transmits, to the third API gateway module 143, the message topic data 136 comprising the first update message data 104. In one embodiment, the third API gateway module 143 receives, from the message topic module 135, the message topic data 136 comprising the first update message data 104, stores the message topic data 136 comprising the first update message data 104 as second subscribed topic data 153 comprising the first update message data 104, and deploys a third update to the third API gateway module 143 based on the first update message data 104.

In one embodiment, the process 300 for self-orchestrated canary release deployment within an API gateway architecture further includes the engineer system 103 transmitting second update message data 104 to the message broker module 130. In one embodiment, the message queue module 131 of the message broker module 130 receives the second update message data 104 and stores the second update message data 104 as message queue data 132 comprising the second update message data 104. In one embodiment, the second API gateway module 142 of the plurality of API gateway modules 241 initiates a second pull, from the message queue module 131, of the message queue data 132 comprising the second update message data 104. In one embodiment, the message queue module 131 transmits, to the second API gateway module 142, the message queue data 132 comprising the second update message data 104 and removes the second update message data 104 from the message queue data 132. In one embodiment, the second API gateway module 142 stores the message queue data 132 comprising the second update message data 104 as pulled queue data 251 (shown in FIG. 2) comprising the second update message data 104, deploys a third update to the second API gateway module 142 based on the second update message data 104, and, upon a successful deployment of the second update, transmits the pulled queue data 251 comprising the second update message data 104 to the message topic module 135 of the message broker module 130.

In one embodiment, the message topic module 135 stores the pulled queue data 251 comprising the second update message data 104 as message topic data 136 comprising the second update message data 104. In one embodiment, the first API gateway module 141 of the plurality of API gateway modules 241 initiates a second subscription, from the message topic module 135, of the message topic data 136 comprising the second update message data 104. In one embodiment, the message topic module 135 transmits, to the first API gateway module 141, the message topic data 136 comprising the second update message data 104. In one embodiment, the first API gateway module 141 stores the message topic data 136 comprising the second update message data 104 as second subscribed topic data 252 (shown in FIG. 2) comprising the second update message data 104, and deploys a fourth update to the first API gateway module 141 based on the second update message data 104.

In one embodiment, the message broker module 130 receives, from the engineer system 103, update message data 104. In one embodiment, the message broker module 130 stores the update message data 104 as message queue data 132 comprising the update message data 104. In one embodiment, the message broker module 130 receives, from the first API gateway module 141, an initiation of a pull of the message queue data 132 comprising the update message data 104. In one embodiment, such receiving conforms to a point-to-point messaging model. In one embodiment, the first API gateway module 141 is a canary API gateway module that initiated the pull before any other API gateway module of the plurality of API gateway modules 142 and 143 through 144. In one embodiment, the message broker module 130 prevents another API gateway module 142 and 143 through 144 from pulling the message queue data 132 comprising the update message data 104.

In one embodiment, the message broker module 130 transmits, to the first API gateway module 141, the message queue data 132 comprising the update message data 104. In one embodiment, the message broker module 130 receives, from the first API gateway module 141, the pulled queue data 151 comprising the update message data 104. In one embodiment, the message broker module 130 stores the pulled queue data 151 comprising the update message data 104 as message topic data 136 comprising the update message data 104. In one embodiment, the message broker module 130 prevents the first API gateway module 141 from subscribing to the message topic data 136 comprising the update message data 104. In one embodiment, such prevention comprises including with the message topic data 136 a representation that the first API gateway module 141 transmitted the pulled queue data 151 comprising the update message data 104 to the message topic module 135 of the message broker module 130.

In one embodiment, the message broker module 130 receives, from at least one of the plurality of API gateway modules 142 and 143 through 144, an initiation of a subscription of the message topic data 136 comprising the update message data 104. In one embodiment, such receiving conforms to a publish-and-subscribe messaging model. In one embodiment, the message broker module 130 transmits, to the at least one of the plurality of API gateway modules 142 and 143 through 144, the message topic data 136 comprising the update message data 104.

In one embodiment, the API gateway module 241 initiates a pull of message queue data 132 comprising first update message data 104 from the message queue module 131 of the message broker module 130. In one embodiment, the API gateway module 241 receives, from the message queue module 131, the message queue data 132 comprising the first update message data 104. In one embodiment, the API gateway module 241 stores the message queue data 132 comprising the first update message data 104 as pulled queue data 251 comprising the first update message data 104.

In one embodiment, the API gateway module 241 deploys a first update based on the first update message data 104. In one embodiment, such deployment represents a role of a canary API gateway module that initiated the pull before any other API gateway module of the API gateway modules 142 and 143 through 144. In one embodiment, such deployment comprises retrieving registry data 126 of a registry module 125 based on the first update message data 104 and deploying the first update based on the retrieved registry data 126, wherein the first update message data 104 comprises a reference to the registry data 126. In one embodiment, upon a successful deployment of the first update, the API gateway module 241 transmits the pulled queue data 251 comprising the first update message data 104 to the message topic module 135 of the message broker module 130. In one embodiment, a successful deployment of the first update is determined based on at least one test of at least one API service module 122.

In one embodiment, the API gateway module 241 initiates a subscription of the message topic data 136 comprising second update message data 104 from the message topic module 135. In one embodiment, the API gateway module 241 receives, from the message topic module 135, the message topic data 136 comprising the second update message data 104. In one embodiment, the API gateway module 241 stores the message topic data 136 comprising the second update message data 104 as subscribed topic data 252 comprising the second update message data 104. In one embodiment, the API gateway module 241 deploys a second update based on the second update message data 104. In one embodiment, the API gateway module 241 receives an API service request from an API consumer module 108 and routes the service request to an API service module 122.

Term Definitions

Various embodiments of systems and methods described herein include one or more computers, which may also be referred to herein as systems, computing systems or processors. As used herein the term computer includes any programmable machine or machines capable of performing arithmetic and/or logical operations. In various embodiments, computers include one or more of processors, memories, data storage devices, and/or other components as discussed herein, and/or as known in the art at the time of filing, and/or as developed after the time of filing. In various embodiments, these components are connected physically or through network or wireless links. In various embodiments, computers include software which directs the operations of the aforementioned components. In various embodiments, the software can thereby transform the aforementioned computers and components into special purpose computers and components.

Herein, computers may also be referred to with terms that are commonly used by those of ordinary skill in the relevant arts, such as servers, PCs, mobile devices, routers, switches, data centers, distributed computers, and other terms. In various embodiments, computers facilitate communications between users and/or other computers, provide databases, perform analysis and/or transformation of data, and/or perform other functions. It will be understood by those of ordinary skill that those terms used herein are interchangeable, and any computer capable of performing the described functions may be used.

In various embodiments, computers may be linked to one another via a network or networks. In various embodiments, a network is any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). In various embodiments, connections between computers may use any protocols, including connection-oriented protocols such as TCP or connectionless protocols such as UDP. Any connection through which at least two computers may exchange data can be the basis of a network.

Herein, the term "production environment" includes the various components, or assets, used to deploy, implement, access, and use, a given application as that application is intended to be used. In various embodiments, production environments include multiple computers and/or assets that are combined, communicatively coupled, virtually and/or physically connected, and/or associated with one another, to provide the production environment implementing the application.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. The hardware systems may employ processing logic that includes one or more processors, microprocessors, multi-core processors, and/or Field Programmable Gate Arrays (FPGAs) to execute operations disclosed herein. One or more memory (volatile and/or non-volatile) may be communicatively coupled to the processing logic to store instructions to execute operations and/or store data. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

Herein, a data management system can be, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

Herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial data management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

As used herein, the terms "artificial intelligence," "machine learning," and "machine learning algorithms" include, but are not limited to, machine learning algorithms for predictive model training operations such as one or more of artificial intelligence operations, regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

As used herein, the terms "user," "client," "customer," and "engineer" include, but are not limited to, any party, parties, entity, or entities using, or otherwise interacting with any of the methods or systems discussed herein. For instance, in various embodiments, a user can be, but is not limited to, a person, a commercial entity, an application, a service, or a computing system. For further instance, in various embodiments, an engineer can be, but is not limited to, one or more people or teams of people who administer an API service system, including developing APIs for one or more API service modules.

As used herein, the term "engineer system" includes, but is not limited to, the following: a computing system; a computing device; a computing entity; a server; a workstation; a desktop computing system; a mobile computing system, including, but not limited to, one or more of smart phones, portable devices, and devices worn or carried by a user; or any device, subsystem, or mechanism that includes components that can execute all, or part, of any one of the processes or operations, as discussed herein, or as known in the art at the time of filing, or as developed, or becomes available, after the time of filing.

As used herein, the term "message broker module" includes, but is not limited to, an asynchronous messaging service between autonomous environments, systems, applications, modules, and other messaging clients as discussed herein, or as known in the art at the time of filing, or as developed, or becomes available, after the time of filing. In one embodiment, a message broker module provides messaging services between an engineer system and a plurality of API gateway modules. In one embodiment, a message broker module utilizes the Java Message Service (JMS) messaging standard.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "training," "extracting," "executing," "mapping," "analyzing," "providing," "enforcing," "monitoring," "generating," "defining," "determining," "calculating," "transforming," "correlating," "normalizing," "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method performed by one or more processors associated with an application program interface (API) service system including at least a message broker and a plurality of API gateways, the method comprising:
   receiving a configuration update to be deployed in each of the plurality of API gateways;
   queuing the configuration update in a message queue configured for point-to-point messaging between the message broker and one of the API gateways;
   receiving, from one or more of the plurality of API gateways, a request to pull the configuration update from the message queue and deploy the queued configuration update in the corresponding API gateway;
   transmitting, using point-to-point messaging, the configuration update from the message queue to a selected one of the one or more API gateways, wherein the selected API gateway serves as a canary API gateway configured to test deployment of the configuration update in the selected API gateway;
   receiving, from the selected API gateway, an indication of a successful deployment of the configuration update;
   providing the configuration update in a message topic component for publish-and-subscribe messaging that is available to each of the non-selected API gateways and unavailable to the selected API gateway;
   receiving, from one or more of the non-selected API gateways, a subscription request for the configuration update provided in the message topic component; and
   transmitting the configuration update from the message topic component to each of the one or more non-selected API gateways based on the received subscription requests concurrently with preventing the non-selected API gateways from pulling the configuration update from the message queue.

2. The method of claim 1, wherein the message broker removes the configuration update from the message queue concurrently with the transmission of the configuration update to the selected API gateway.

3. The method of claim 1, wherein the configuration update provided in the message topic component is simultaneously made available to all of the non-selected API gateways.

4. The method of claim 1, wherein each of the plurality of API gateways is configured to be an API proxy for at least one API consumer.

5. The method of claim 1, wherein the message queue is configured to provide the configuration update to only one API gateway of the plurality of API gateways.

6. The method of claim 1, wherein the selected API gateway initiates a subscription of the configuration update provided in the message topic component.

7. The method of claim 1, wherein the configuration update is concurrently transmitted from the message topic component to each of the one or more non-selected API gateways.

8. The method of claim 1, wherein the API service system comprises a self-orchestrated canary release deployment system.

9. An application program interface (API) service system comprising:
   a message broker;
   a plurality of API gateways;
   one or more processors; and
   a memory coupled to the one or more processors and storing instructions that, when executed by the one or more processors, causes the API service system to perform operations comprising:
   receiving a configuration update to be deployed in each of the plurality of API gateways;
   queuing the configuration update in a message queue configured for point-to-point messaging between the message broker and one of the API gateways;
   receiving, from one or more of the plurality of API gateways, a request to pull the configuration update from the message queue and deploy the queued configuration update in the corresponding API gateway;
   transmitting, using point-to-point messaging, the queued configuration update from the message queue to a selected one of the one or more API gateways, wherein the selected API gateway serves as a canary API gateway configured to test deployment of the configuration update in the selected API gateway;
   receiving, from the selected API gateway, an indication of a successful deployment of the configuration update;
   providing the configuration update in a message topic component for publish-and-subscribe messaging that is available to each of the non-selected API gateways and unavailable to the selected API gateway;

receiving, from one or more of the non-selected API gateways, a subscription request for the configuration update provided in the message topic component; and transmitting the configuration update from the message topic component to each of the one or more non-selected API gateways based on the received subscription requests concurrently with preventing the non-selected API gateways from pulling the configuration update from the message queue.

10. The API service system of claim 9, wherein the message broker is configured to remove the configuration update from the message queue concurrently with the transmission of the configuration update to the selected API gateway.

11. The API service system of claim 9, wherein the configuration update provided in the message topic component is simultaneously made available to all of the non-selected API gateways.

12. The API service system of claim 9, wherein each of the plurality of API gateways is configured to be an API proxy for at least one API consumer.

13. The API service system of claim 9, wherein the message queue is configured to provide the configuration update to only one API gateway of the plurality of API gateways.

14. The API service system of claim 9, wherein the selected API gateway initiates a subscription of the configuration update provided in the message topic component.

15. The API service system of claim 9, wherein the configuration update is concurrently transmitted from the message topic component to each of the one or more non-selected API gateways.

16. The API service system of claim 9, wherein the API service system comprises a self-orchestrated canary release deployment system.

* * * * *